(12) United States Patent
Xu et al.

(10) Patent No.: US 12,422,263 B2
(45) Date of Patent: Sep. 23, 2025

(54) TRAVEL PLAN ROUTE GENERATION METHOD AND TRAVEL PLAN ROUTE GENERATION SYSTEM

(71) Applicant: ZHEJIANG FURUIDENG SPORTS GOODS CO., LTD., Zhejiang (CN)

(72) Inventors: Yongqiang Xu, Zhejiang (CN); Min Yan, Zhejiang (CN)

(73) Assignee: ZHEJIANG FURUIDENG SPORTS GOODS CO., LTD., Zhejiang (CN)

( * ) Notice: Subject to any disclaimer, the term of this patent is extended or adjusted under 35 U.S.C. 154(b) by 96 days.

(21) Appl. No.: 18/396,623

(22) Filed: Dec. 26, 2023

(65) Prior Publication Data
US 2025/0130056 A1   Apr. 24, 2025

(30) Foreign Application Priority Data
Oct. 23, 2023   (CN) .......................... 202311372087.0

(51) Int. Cl.
  *G01C 21/34*   (2006.01)
  *G06F 16/9537*   (2019.01)
(52) U.S. Cl.
  CPC ..... *G01C 21/3476* (2013.01); *G06F 16/9537* (2019.01)
(58) Field of Classification Search
  CPC .................. G06F 16/9537; G01C 21/3476
  USPC .......................................... 701/421
  See application file for complete search history.

(56) References Cited

U.S. PATENT DOCUMENTS

| | | | | |
|---|---|---|---|---|
| 8,620,579 B1 * | 12/2013 | Upstill | ............... | G01C 21/3679 701/428 |
| 8,924,148 B2 * | 12/2014 | Nesbitt | ............... | G01C 21/3476 701/426 |
| 9,726,510 B2 * | 8/2017 | Peri | ..................... | G01C 21/3476 |
| 10,036,646 B2 * | 7/2018 | Schumann | ............ | H04W 4/029 |
| 10,151,597 B2 * | 12/2018 | Mutoh | ............... | G01C 21/3617 |
| 11,725,954 B2 * | 8/2023 | Chan | .................... | G05D 1/0285 701/421 |
| 11,748,696 B2 | 9/2023 | Altenhoff | ............... | G06Q 10/08 705/338 |
| 2004/0260465 A1 * | 12/2004 | Tu | .......................... | G01C 21/34 701/426 |
| 2005/0256639 A1 * | 11/2005 | Aleksic | ............. | G01C 21/3415 340/995.13 |

(Continued)

*Primary Examiner* — Joshua E Rodden
(74) *Attorney, Agent, or Firm* — JCIPRNET

(57) ABSTRACT

The present invention discloses a travel plan route generation method and system. The method includes: obtaining a cycling start point and a cycling end point inputted by a user, and determining a point of interest (POI) selectable region between the cycling start point and the cycling end point; obtaining POI category labels inputted by the user, and counting the number n of the POI category labels inputted by the user; finding out all POIs belonging to the corresponding categories of the n POI category labels in the POI selectable region, and taking these POIs as alternative POIs; planning several recommended cycling routes for the user to select according to the sequence of the n POI category labels inputted by the user, and calculating the estimated cycling time of each recommended cycling route; and generating a corresponding travel plan route according to the recommended cycling route selected by the user.

16 Claims, 3 Drawing Sheets

(56) References Cited

U.S. PATENT DOCUMENTS

| | | | | |
|---|---|---|---|---|
| 2008/0120022 A1* | 5/2008 | Hayot | ............... | G01C 21/3476 |
| | | | | 701/533 |
| 2011/0144903 A1* | 6/2011 | Gupta | ............... | G01C 21/3476 |
| | | | | 701/533 |
| 2012/0197524 A1* | 8/2012 | Beyeler | ............. | G01C 21/3476 |
| | | | | 701/426 |
| 2012/0323485 A1* | 12/2012 | Mutoh | ................... | G01S 19/13 |
| | | | | 701/428 |
| 2014/0107916 A1* | 4/2014 | Urup | ................ | G01C 21/3629 |
| | | | | 701/487 |
| 2018/0283886 A1* | 10/2018 | Mas-Ud Hussain | ......................... | |
| | | | | G01C 21/3415 |
| 2020/0271472 A1* | 8/2020 | Bouve | ................ | G01C 21/3476 |
| 2022/0316898 A1* | 10/2022 | Mayster | ............ | G01C 21/3469 |

* cited by examiner

TRAVEL PLAN ROUTE GENERATION METHOD AND TRAVEL PLAN ROUTE GENERATION SYSTEM

CROSS-REFERENCE TO RELATED APPLICATION

This application claims the priority benefit of China application serial no. 202311372087.0, filed on Oct. 23, 2023. The entirety of the above-mentioned patent application is hereby incorporated by reference herein and made a part of this specification.

TECHNICAL FIELD

The present invention relates to the technical field of intelligent route generation, in particular to a travel plan route generation method and a travel plan route generation system.

BACKGROUND

With the increasing attention to health and environmental protection, cycling has gradually become a popular way of fitness. However, due to the lack of systematic cycling route planning and guidance, many cyclists are unable to plan suitable travel plan routes, thus affecting the cycling experience.

Currently, cyclists generally obtain travel plan routes created by others through travel plan recommendation software, or manually design travel plan routes by themselves. However, the travel plan recommendation software can only recommend specific travel plan routes created by others, users may not be able to find suitable travel plan routes, and the finding process is troublesome. Moreover, it is time-consuming and labor-intensive to manually design the road book route by themselves.

SUMMARY

In order to solve the above technical problems, the present invention provides a travel plan route generation method and system, which can automatically and quickly generate several recommended cycling routes for a user to select according to user needs, and automatically generate a corresponding travel plan route according to the selection of the user.

In order to solve the above problems, the present invention adopts the following technical solution for implementation:

A travel plan route generation method of the present invention includes the following steps:
S1: obtaining cycling start point position information and cycling end point position information inputted by a user, and determining a point of interest (POI) selectable region between a cycling start point position and a cycling end point position;
S2: obtaining POI category labels inputted by the user, and counting the number n of the POI category labels inputted by the user;
S3: finding out all POIs belonging to the corresponding categories of the n POI category labels in the POI selectable region, and taking these POIs as alternative POIs;
S4: sequentially numbering the n POI category labels as 1, 2, . . . , n according to the sequence of the n POI category labels inputted by the user, planning several recommended cycling routes from the cycling start point position to the cycling end point position for the user to select, each recommended cycling route sequentially passing through one alternative POI corresponding to each of the POI category labels numbered from 1 to n from front to back, and calculating the estimated cycling time of each recommended cycling route; and
S5: generating a corresponding travel plan route according to the recommended cycling route selected by the user.

In this solution, first, the POI selectable region is drawn on an electronic map according to the cycling start point and cycling end point inputted by the user, and the POI selectable region is located between the cycling start point position and the cycling end point position.

Subsequently, the POI category labels inputted by the user are obtained, and the number n of the POI category labels inputted by the user is counted. The point of interest is the POI, the category corresponding to each POI is stored in a POI information database, and the POI category label is used for representing the corresponding POI category.

Then, with reference to the electronic map and the POI data in the POI information database, all POIs belonging to the corresponding categories of the n POI category labels in the POI selectable region are found, and these POIs are taken as the alternative POIs.

Finally, several recommended cycling routes are planned according to the cycling start point, the cycling end point, the inputted POI category labels and the input sequence. The recommended cycling route needs to meet the requirement of starting from the start point, sequentially passing through the corresponding POI according to the input sequence of the POI category labels, and finally reaching the end point. In this way, the user can obtain several recommended cycling routes that meet the own needs. The corresponding travel plan route is generated according to the recommended cycling route selected by the user.

Preferably, the method for determining the POI selectable region between the cycling start point position and the cycling end point position in step S1 is as follows:
drawing an ellipse on an electronic map by taking the cycling start point position and the cycling end point position as two end points of the major axis of the ellipse, where the length a of the major axis of the ellipse is equal to a linear distance between the cycling start point position and the cycling end point position, the length b of the minor axis of the ellipse meets: $b=\beta*a$, and $\beta$ being a positive number less than 1; and taking a region surrounded by the ellipse as the POI selectable region.

Thus, the planned cycling route will not deviate from the cycling start point position and the cycling end point position.

Preferably, step S2 includes the following steps:
S21: finding out all POI category labels available for the user to input and the number of times each POI category label that can be inputted in the POI selectable region for the user to select and input, where;
the number of times each POI category label can be inputted is equal to the total number of POIs belonging to the corresponding category of the POI category label in the POI selectable region; and
S22: after the user inputs all the selected POI category labels, obtaining the POI category labels inputted by the user and the input sequence, and counting the number n of the POI category labels inputted by the user.

A human-computer interaction terminal displays the POI category labels available for the user to input and the number of times each POI category label can be inputted, thus avoiding the situation that the user inputs a POI category label m times but without m POIs belonging to the corresponding category of the POI category label in the POI selectable region.

Preferably, step S3 includes the following specific steps:
finding out all POIs located in the POI selectable region and belonging to the corresponding category of the POI category label from a POI information database according to each POI category label inputted by the user, and taking these POIs as alternative POIs.

Preferably, step S4 includes the following steps:
S41: sequentially numbering the n POI category labels as 1, 2, . . . , n according to the sequence of the n POI category labels inputted by the user;
S42: planning all cycling routes that start from the cycling start point position, then sequentially passing through one alternative POI corresponding to each of the POI category labels numbered from 1 to n from front to back, and finally reaching the cycling end point position;
S43: calculating a cycling distance of each cycling route, and taking the cycling route with a cycling distance less than a maximum cycling distance d as a recommended cycling route for the user to select; and
S44: calculating the estimated cycling time of each recommended cycling route.

The recommended cycling route starts from the start point, first passes through one alternative POI corresponding to the POI category label numbered as 1 (that is, the alternative POI belongs to the corresponding category of the POI category label numbered as 1), subsequently passes through one alternative POI corresponding to the POI category label numbered as 2, then passes through one alternative POI corresponding to the POI category label numbered as 3, . . . , finally passes through one alternative POI corresponding to the POI category label numbered as n, and then reaches the end point.

Preferably, n alternative POIs that each cycling route passes through planned in step S42 are all different, so that the POIs that the recommended cycling route passes through will not be repeated.

Preferably, the maximum cycling distance d is calculated by the following formula: d=α*a, and α being a positive number greater than 1.

Preferably, the method for calculating the estimated cycling time of the recommended cycling route in step S4 is as follows:
N1: counting the number m of types of road conditions in the recommended cycling routes, sequentially numbering the m road conditions as 1, 2, . . . , m, finding out road condition distances $D_1, D_2 \ldots D_m$ corresponding to the road conditions numbered as 1, 2, . . . , m in the cycling routes, and finding out user cycling base speeds $TS_1, TS_2 \ldots TS_m$ corresponding to the road conditions numbered as 1, 2, . . . , m; and
N2: calculating the estimated cycling time of the recommended cycling route by the following formula:

$$ET = \left(\frac{D_1}{TS_1} + \frac{D_2}{TS_2} + \ldots \frac{D_m}{TS_m}\right) * (1 + WCF);$$

where ET represents the estimated cycling time of the recommended cycling route, and WCF represents a weather correction factor.

Each weather has a corresponding WCF value.
Preferably, the WCF is calculated by the following formula:

$$WCF = \frac{BS - WS}{WS};$$

where BS represents a historical cycling average speed under sunny highway conditions of a user, and WS represents a historical cycling average speed under weather conditions and highway conditions during cycling of a user.

Preferably, step S4 further includes the following step:
calculating the estimated total time TA of each recommended cycling route.

The method for calculating the estimated total time TA of one of the recommended cycling route is as follows:
sequentially numbering the n POIs that the recommended cycling route passes through as 1, 2, . . . , n from front to back, where 1≤i≤n; calculating the estimated residence time of each POI, where the estimated residence time of the POI numbered as i is $t_i$; and calculating the estimated total time TA: $TA=ET+\Sigma_{i=1}^{n} t_i$.

Preferably, step S2 includes the following steps:
S21: taking the POI selectable region as an alternative region $F_0$, and finding out all POI category labels available for the user to input in the alternative region $F_0$ as alternative labels, where all alternative labels form an alternative label group for the user to select and input, and the user can only select an alternative label from the alternative label group and input the alternative label;
S22: obtaining the alternative label inputted by the user, and updating the alternative label group every time when the user selects an alternative label from the alternative label group and inputs the alternative label, where the user can only select the next alternative label from the updated alternative label group and input the next alternative label;
when obtaining a selection completion instruction inputted by the user, counting all POI category labels inputted by the user and the input sequence, and counting the number n of the POI category labels inputted by the user;
where when the user inputs the $i^{th}$ alternative label (1≤i≤n), the method for updating the alternative label group is as follows:
determining an alternative region $F_i$ according to the $i^{th}$ alternative label, finding out all POI category labels available for the user to input in the alternative region $F_i$ as new alternative labels, and forming a new alternative label group by all new alternative labels to replace the original alternative label group, thereby completing the update of the alternative label group;
where the method for determining the alternative region $F_i$ according to the $i^{th}$ alternative label is as follows:
finding out all POIs belonging to the corresponding category of the $i^{th}$ alternative label in an alternative region $F_{i-1}$, calculating a sub-alternative region corresponding to each POI, and taking a union set of all sub-alternative regions as an alternative region $F_i$;

where the method for calculating a sub-alternative region corresponding to a POI is as follows:

drawing an ellipse on an electronic map by taking the position of the POI and the cycling end point position as two end points of the major axis of the ellipse, where the length d of the major axis of the ellipse is equal to a linear distance between the position of the POI and the cycling end point position, the length f of the minor axis of the ellipse meets: $f=\beta*d$, and $\beta$ being a positive number less than 1; taking a region surrounded by the ellipse as a sub-alternative region corresponding to the POI;

where the n POIs that the cycling routes planned in step S42 pass through need to meet the following requirements:

sequentially numbering the n POIs that the cycling routes pass through as 1, 2, . . . , n from front to back, and the POI numbered as k+1 needing to be located in a sub-alternative region corresponding to the POI numbered as k, where $1 \le k \le n-1$.

A travel plan route generation system of the present invention, used for the above travel plan route generation method, includes:

a human-computer interaction terminal configured to perform human-computer interaction with a user;

a data collection module configured to collect cycling trajectories, cycling data, input instructions and latest POI information of the user, and store them in a cloud server;

a data analysis module configured to perform statistical analysis of the collected data; and a route planning module configured to automatically plan multiple suitable recommended cycling routes according to the cycling start point position information, cycling end point position information and POI category labels inputted by the user, calculate the estimated cycling time of each recommended cycling route, and provide multiple combination selections for different user needs.

DETAILED DESCRIPTION

The technical solutions of the present invention will be further specifically described below through the embodiments with reference to the accompanying drawings.

Embodiment 1

Figure 1:
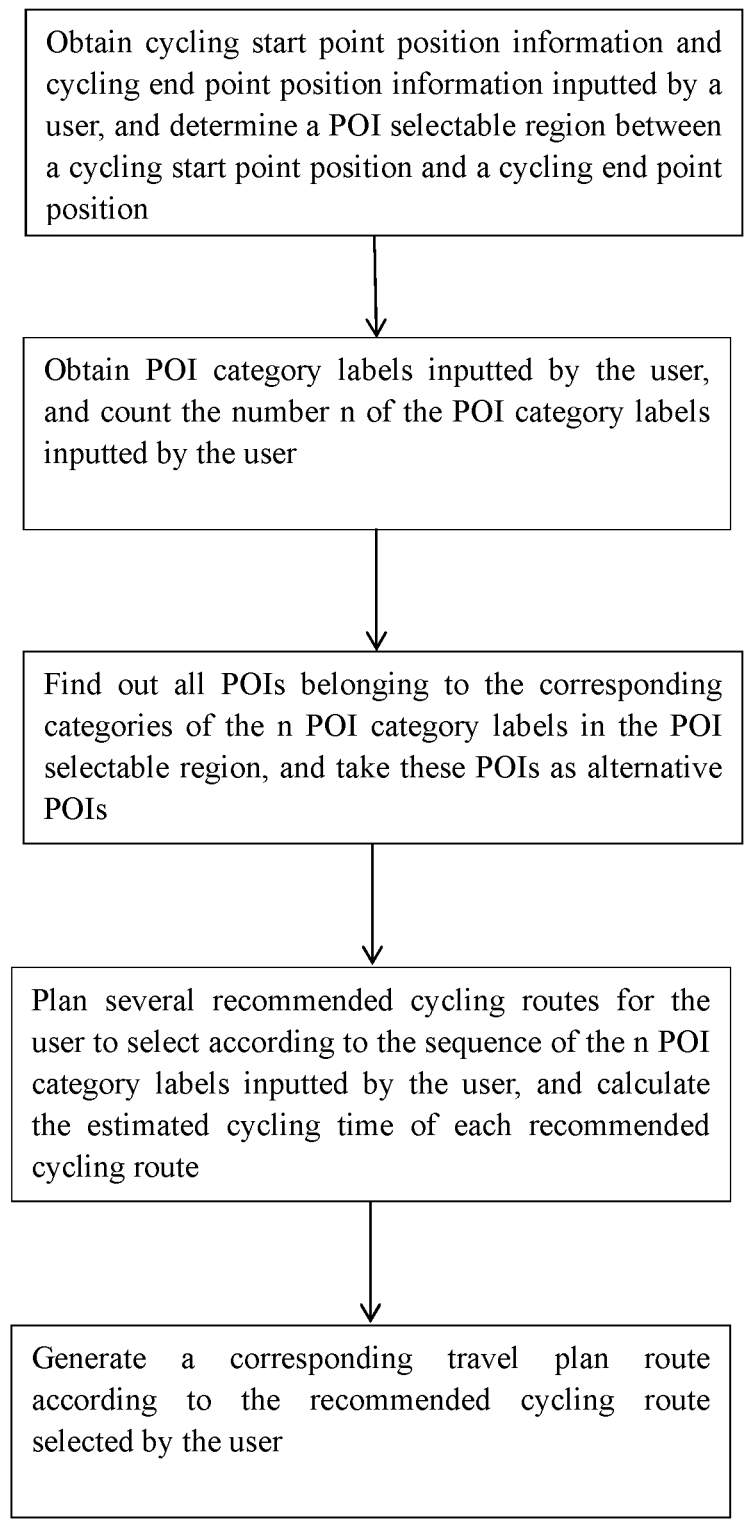
FIG. 1 is a flowchart of Embodiment 1.

A travel plan route generation method in this embodiment, as shown in FIG. 1, includes the following steps:

S1: obtaining cycling start point position information and cycling end point position information inputted by a user, and drawing a POI selectable region between a cycling start point position and a cycling end point position on an electronic map;

S2: obtaining POI category labels inputted by the user, and counting the number n of the POI category labels inputted by the user;

S3: finding out all POIs belonging to the corresponding categories of the n POI category labels in the POI selectable region, and taking these POIs as alternative POIs;

S4: sequentially numbering the n POI category labels as 1, 2, . . . , n according to the sequence of the n POI category labels inputted by the user, planning several recommended cycling routes from the cycling start point position to the cycling end point position for the user to select, each recommended cycling route sequentially passing through one alternative POI corresponding to each of the POI category labels numbered from 1 to n from front to back, and calculating the estimated cycling time of each recommended cycling route; and S5: generating a corresponding travel plan route according to the recommended cycling route selected by the user.

The method for determining the POI selectable region between the cycling start point position and the cycling end point position in step S1 is as follows:

drawing an ellipse on an electronic map by taking the cycling start point position and the cycling end point position as two end points of the major axis of the ellipse, where the length a of the major axis of the ellipse is equal to a linear distance between the cycling start point position and the cycling end point position, the length b of the minor axis of the ellipse meets: $b=\beta*a$, and $\beta$ being a positive number less than 1 ($0<\beta<1$); and taking a region surrounded by the ellipse as the POI selectable region.

Step S2 includes the following steps:

S21: finding out all POI category labels available for the user to input and the number of times each POI category label can be inputted in the POI selectable region from a POI information database for the user to select and input, where;

the number of times each POI category label can be inputted is equal to the total number of POIs belonging to the corresponding category of the POI category label in the POI selectable region; and S22: after the user inputs all selected POI category labels, obtaining the POI category labels inputted by the user and the input sequence, and counting the number n of the POI category labels inputted by the user.

Step S3 includes the following specific steps:

finding out all POIs located in the POI selectable region and belonging to the corresponding category of the POI category label from a POI information database according to each POI category label inputted by the user, and taking these POIs as alternative POIs.

Step S4 includes the following steps:

S41: sequentially numbering the n POI category labels as 1, 2, . . . , n according to the sequence of the n POI category labels inputted by the user;

S42: all cycling routes that start from the cycling start point position, then sequentially passing through one alternative POI corresponding to each of the POI category labels numbered from 1 to n from front to back, and finally reaching the cycling end point position are planned, where n alternative POIs that each planned cycling route passes through are all different;

S43: calculating a cycling distance of each cycling route, and taking the cycling route with a cycling distance less than a maximum cycling distance d as a recommended cycling route for the user to select, where the maximum cycling distance d is calculated by the following formula: d=α*a, and α being a positive number greater than 1; and S44: calculating the estimated cycling time of each recommended cycling route.

The method for calculating the estimated cycling time of the recommended cycling route is as follows:

N1: counting the number m of types of road conditions in the recommended cycling routes, sequentially numbering the m road conditions as 1, 2, . . . , m, finding out road condition distances $D_1, D_2 \ldots D_m$ corresponding to the road conditions numbered as 1, 2, . . . , m in the cycling routes, and finding out user cycling base speeds $TS_1, TS_2 \ldots TS_m$ corresponding to the road conditions numbered as 1, 2, . . . , m, where $TS_j$ represents a historical cycling average speed under the sunny road condition of a user numbered as j, and $1 \leq j \leq m$; and N2: calculating the estimated cycling time of the recommended cycling route by the following formula:

$$ET = \left(\frac{D_1}{TS_1} + \frac{D_2}{TS_2} + \ldots \frac{D_m}{TS_m}\right) * (1 + WCF);$$

where ET represents the estimated cycling time of the recommended cycling route, and WCF represents a weather correction factor.

The WCF is calculated by the following formula:

$$WCF = \frac{BS - WS}{WS};$$

where BS represents a historical cycling average speed under a sunny flat highway condition of a user, and WS represents a historical cycling average speed under a weather condition during cycling and a flat highway condition of a user.

In this solution, first, the POI selectable region is drawn on the electronic map according to the cycling start point and cycling end point inputted by the user, and the ellipse drawn by taking the cycling start point position and the cycling end point position as the major axis of the ellipse is taken as the POI selectable region, so that the planned cycling route will not deviate from the cycling start point position and the cycling end point position.

Subsequently, the POI category labels inputted by the user are obtained, and the number n of the POI category labels inputted by the user is counted. The point of interest is the POI, the category corresponding to each POI is stored in the POI information database, and the POI category label is used for representing the corresponding POI category. A human-computer interaction terminal displays the POI category labels available for the user to input and the number of times each POI category label can be inputted, thus avoiding the situation that the user inputs a POI category label m times but there are no m POIs belonging to the corresponding category of the POI category label in the POI selectable region.

Then, with reference to the electronic map and the POI data in the POI information database, all POIs belonging to the corresponding categories of the n POI category labels in the POI selectable region are found, and these POIs are taken as the alternative POIs. The found alternative POI needs to belong to one category in the n POI category labels inputted by the user.

Finally, several recommended cycling routes are planned according to the cycling start point, the cycling end point, the inputted POI category labels and the input sequence. The recommended cycling route needs to meet the requirement of starting from the start point, sequentially passing through the corresponding POI according to the input sequence of the POI category labels, and finally reaching the end point. In this way, the user can obtain several recommended cycling routes that meet the own needs. The corresponding travel plan route is generated according to the recommended cycling route selected by the user.

The n alternative POIs that the cycling routes planned in step S42 pass through are all different, so that the POIs that the recommended cycling route passes through will not be repeated.

The estimated cycling time is calculated according to various different road conditions in the recommended cycling routes and the weather condition on the day of cycling, thus being convenient for the user to select a suitable cycling route. The types of road conditions can be divided into flat highways, uphill highways, downhill highways, uphill mountainous regions, downhill mountainous regions, and the like. The types of weather can be divided into sunny day, rainy day, snowy day, and the like.

During the entire process of generating the travel plan route, the user only needs to input the cycling start point, the cycling end point and the POI category labels, so the operation is simple and convenient. This method can quickly and automatically generate a travel plan route according to the cycling start point and cycling end point set by the user and the category of the POI that the user wants to pass through during the cycling process.

POI classification: POIs (POI data) are classified according to different categories, such as supermarkets, tourist attractions, hospitals, schools, and restaurants. The classification method adopts a keyword matching based method to identify and extract keywords and features in POI data labels, so as to perform automatic classification.

Fine labeling: Each POI classification is labeled and described based on the collected feature data. For example, different supermarket types are finely labeled, and the types, scales and the like of tourist attractions are described. The characteristics of each classification are labeled and referenced, and described in the form of structured texts, labels, popularity, or the like. For example:

Supermarkets: Different supermarkets are labeled as retail supermarkets, wholesale supermarkets, convenience stores, and the like, and the characteristics such as commodity types, scales and service levels of the supermarkets are described.

Tourist attractions: Different tourist attractions are labeled as natural landscapes, cultural attractions, and the like, and the characteristics such as scales, beauty levels and the number of visitors of the tourist attractions are described.

Hotels: Different hotels are labeled as economy hotels, comfort hotels, luxury hotels, and the like, and the characteristics such as star rating, facilities and quality of service of the hotels are described.

Fine labeling and description can provide users with more accurate and personalized search and recommendation services, thus improving the experience and satisfaction of users.

Examples

A POI selectable region is determined according to the cycling start point position information and cycling end point position information inputted by a user, and POI category labels available for the user to input in the POI selectable region are found: Hospital, Restaurant, School, and Supermarket. The POI category label "Hospital" corresponds to two POIs: Hospital 1, and Hospital 2. The POI category label "Restaurant" corresponds to two POIs: Restaurant 1, and Restaurant 2. The POI category label "School" corresponds to two POIs: School 1, and School 2. The POI category label "Supermarket" corresponds to three POIs: Supermarket 1, Supermarket 2, and Supermarket 3. A human-computer interaction terminal displays these four POI category labels.

Figure 2:
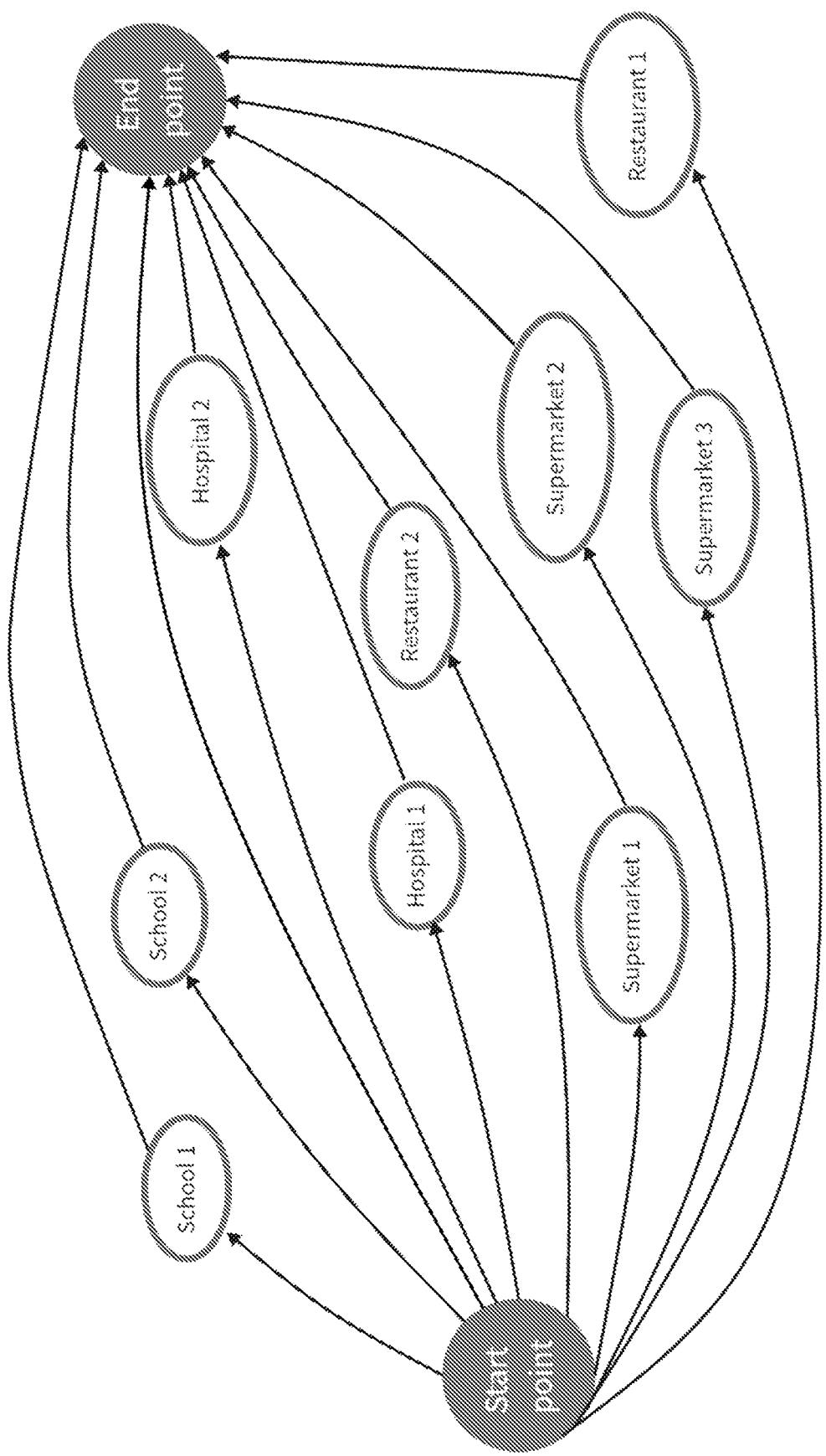
FIG. 2 is a schematic view of an example of a planned cycling route.

When the user only selects and inputs the POI category label "Hospital", only two recommended cycling routes from a start point to Hospital 1 or Hospital 2 and then to an end point are planned. When the user only selects and inputs the POI category label "Restaurant", only two recommended cycling routes from a start point to Restaurant 1 or Restaurant 2 and then to an end point are planned. When the user only selects and inputs the POI category label "School", only two recommended cycling routes from a start point to School 1 or School 2 and then to an end point are planned. When the user only selects and inputs the POI category label "Supermarket", only three recommended cycling routes from a start point to Supermarket 1 or Supermarket 2 or Supermarket 3 and then to an end point are planned. As shown in FIG. 2, FIG. 2 shows recommended cycling routes corresponding to the four inputs mentioned above.

Figure 3:
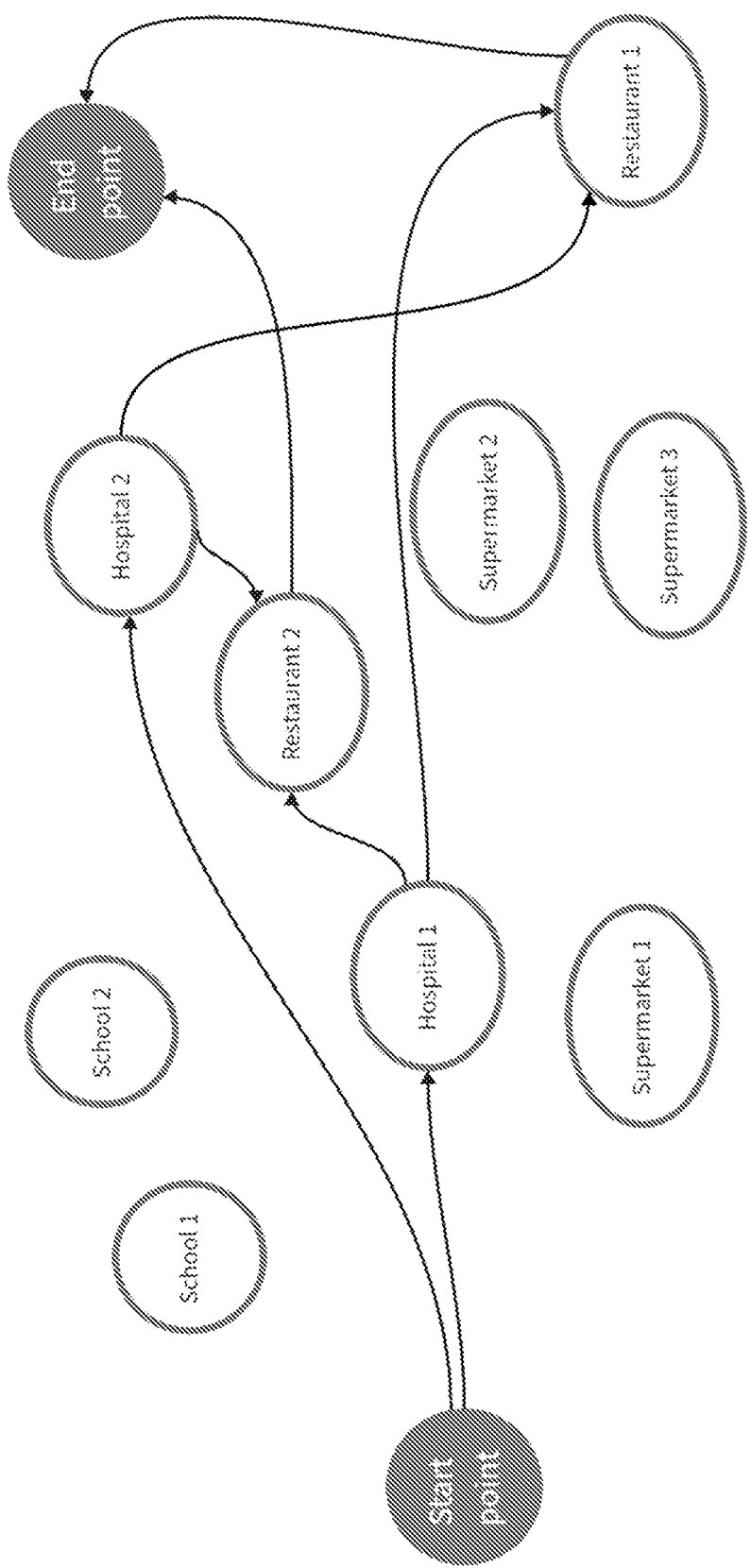
FIG. 3 is a schematic view of an example of a planned cycling route.

When the user first selects and inputs the POI category label "Hospital" and then selects and inputs the POI category label "Restaurant", four recommended cycling routes, as shown in FIG. 3, are planned respectively:
  recommended cycling route I: passing through start point, Hospital 1, Restaurant 2 and end point sequentially from front to back;
  recommended cycling route II: passing through start point, Hospital 1, Restaurant 1 and end point sequentially from front to back;
  recommended cycling route III: passing through start point, Hospital 2, Restaurant 2 and end point sequentially from front to back; and
  recommended cycling route IV: passing through start point, Hospital 2, Restaurant 1 and end point sequentially from front to back.

The recommended cycling routes are arranged according to the distance from the start point to the first POI.

Step S4 further includes the following step:
  calculating the estimated total time TA of each recommended cycling route.

The method for calculating the estimated total time TA of one of the recommended cycling route is as follows:
  the n POIs that the recommended cycling route passes through are sequentially numbered as 1, 2, . . . , n from front to back, where $1 \le i \le n$; calculating the estimated residence time of each POI, where the estimated residence time of the POI numbered as i is $t_i$; and calculating the estimated total time TA: $TA = ET + \sum_{i=1}^{n} t_i$. The estimated residence time of each POI is obtained by calculating the user average residence time of the corresponding POI.

The human-computer interaction terminal displays the recommended cycling routes and the estimated cycling time and estimated total time TA of each recommended cycling route, the user selects one recommended cycling route as the travel plan route, and the corresponding travel plan route is generated according to the recommended cycling route selected by the user.

The travel plan route generated in step S5 displays the cycling time of the route between adjacent POIs, the estimated residence time of each POI, the introduction of each POI, and the estimated cycling time and estimated total time TA of the entire travel plan route.

The travel plan route generation method in this embodiment further includes the following step:
  when the user cycles along the generated travel plan route, calculating the estimated remaining cycling time ST in real time:

$$ST = \frac{LD - DT}{LTS_1} * TCF * (1 + LCF + RCF);$$

$$TCF = \frac{\frac{LD_1}{LTS_1} + \frac{LD_2}{LTS_2} + \ldots + \frac{LD_P}{LTS_P}}{\frac{LD}{LTS_1}};$$

$$LD = \sum_{r=1}^{p} LD_r;$$

$$LCF = \frac{LTS_1 - FS}{FS};$$

$$RCF = \frac{ND + DT - LD}{ND};$$

where $1 \le r \le p$, LD represents a total distance of the travel plan route, DT represents a cycling distance of the user along the travel plan route, TCF represents a road condition correction factor, LCF represents a weather correction factor, RCF represents a route correction factor, p represents the total number of types of road conditions in the travel plan route, p road conditions in the travel plan route are sequentially numbered as 1, 2, . . . , p, $LD_1, LD_2 \ldots LD_p$ represent road condition distances corresponding to the road conditions numbered as 1, 2, . . . , p in the travel plan route, the road condition numbered as 1 is a flat highway condition, $LTS_1, LTS_2, \ldots LTS_m$ represent user cycling base speeds corresponding to the road conditions numbered as 1, 2, . . . , p, FS represents a user historical cycling average speed under the current weather condition and a flat highway condition, and ND represents a new route distance between the current user position and the end point. A new route is the sum of the distance planned by the user to return to the travel plan route after deviating from the travel plan route and the remaining travel plan route distance.

$LTS_1, LTS_2 \ldots LTS_m$ may be calculated through historical data and user cycling records. The LCF represents the difference between the cycling speed under the current weather and the base speed. When the weather changes, it is necessary to dynamically update the value of the FS so as to reflect the impact of the real-time weather condition on the cycling speed. The RCF represents the impact of the new route change caused by the user deviating from the travel plan route on the cycling time.

A travel plan route generation system in this embodiment, used for the above travel plan route generation method, includes:
  a human-computer interaction terminal configured to perform human-computer interaction with a user;
  a data collection module configured to collect cycling trajectories, cycling data, input instructions and latest POI information of the user, and store them in a cloud server;

a data analysis module configured to perform statistical analysis of the collected data; and a route planning module configured to automatically plan multiple suitable recommended cycling routes according to the cycling start point position information, cycling end point position information and POI category labels inputted by the user, calculate the estimated cycling time of each recommended cycling route, and provide multiple combination selections for different user needs.

In this solution, the data collected by the data collection module can be used for route planning and data analysis, and the data analysis module can be configured to analyze the data collected by the data collection module to fetch useful feature information and classify and label the useful feature information.

During use, the user can conveniently select a specified label (that is, POI category label) through a human-computer interaction interface of the human-computer interaction terminal, the route planning module quickly plans multiple recommended cycling routes and displays the recommended cycling routes on the human-computer interaction terminal, the recommended cycling route with the closest distance is displayed preferentially, and the user can select a suitable recommended cycling route as a travel plan route.

The route planning module which adopts a distributed calculating model can automatically store all calculated route information into a distributed database and perform backup and synchronization, so as to ensure the reliability and security of data.

The travel plan route generation system in this embodiment further includes:

a route optimization module configured to optimize and correct the accuracy of the existing routes by accessing road condition data in a map database and meteorological data, calculate and synchronously estimate the arrival time to the user in real time, and synchronize the optimized route data to the cloud server; and a recommendation module configured to recommend the most suitable route by accurately analyzing the user historical travel data and preferences based on external factors such as the current road condition, weather and temperature. In addition, this module can also perform machine learning according to the information such as feedback and evaluation from different users, so as to continuously optimize and improve the accuracy and personalization of route recommendation.

In order to improve the accuracy and practicality of route planning within a region, when there are multiple cycling records in a region, by adopting the machine learning technology, the system will regularly and automatically analyze the latest map data and adaptively update and optimize the POI data routes in the region. The system will also generate popular cycling travel plans for the region and recommend the popular cycling travel plans to nearby cyclists. This route planning method can effectively meet the travel demands of different scenarios, so users can achieve their travel goals more easily.

Embodiment 2

A travel plan route generation method in this embodiment includes the following steps:

S1: obtaining cycling start point position information and cycling end point position information inputted by a user, and drawing a POI selectable region between a cycling start point position and a cycling end point position on an electronic map;

S2: obtaining POI category labels inputted by the user, and counting the number n of the POI category labels inputted by the user;

S3: finding out all POIs belonging to the corresponding categories of the n POI category labels in the POI selectable region, and taking these POIs as alternative POIs;

S4: sequentially numbering the n POI category labels as 1, 2, . . . , n according to the sequence of the n POI category labels inputted by the user, planning several recommended cycling routes from the cycling start point position to the cycling end point position for the user to select, each recommended cycling route sequentially passing through one alternative POI corresponding to each of the POI category labels numbered from 1 to n from front to back, and calculating the estimated cycling time of each recommended cycling route; and S5: generating a corresponding travel plan route according to the recommended cycling route selected by the user.

The method for determining the POI selectable region between the cycling start point position and the cycling end point position in step S1 is as follows:

drawing an ellipse on an electronic map by taking the cycling start point position and the cycling end point position as two end points of the major axis of the ellipse, where the length a of the major axis of the ellipse is equal to a linear distance between the cycling start point position and the cycling end point position, the length b of the minor axis of the ellipse meets: $b=\beta*a$, and $\beta$ being a positive number less than 1 ($0<\beta<1$); and taking a region surrounded by the ellipse as the POI selectable region.

Step S2 includes the following steps:

S21: taking the POI selectable region as an alternative region $F_0$, and finding out all POI category labels available for the user to input in the alternative region $F_0$ as alternative labels, where all alternative labels form an alternative label group for the user to select and input, and the user can only select an alternative label from the alternative label group and input the alternative label;

S22: obtaining the alternative label inputted by the user, and updating the alternative label group every time when the user selects an alternative label from the alternative label group and inputs the alternative label, where the user can only select the next alternative label from the updated alternative label group and input the next alternative label; and when a selection completion instruction inputted by the user is obtained, counting all POI category labels inputted by the user and the input sequence, and counting the number n of the POI category labels inputted by the user.

When the user inputs the $i^{th}$ alternative label ($1 \le i \le n$), the method for updating the alternative label group is as follows: determining an alternative region $F_i$ according to the $i^{th}$ alternative label, finding out all POI category labels available for the user to input in the alternative region $F_i$ as new alternative labels, and forming a new alternative label group by all new alternative labels to replace the original alternative label group, thereby completing the update of the alternative label group.

The method for determining the alternative region $F_i$ according to the $i^{th}$ alternative label is as follows:

finding out all POIs belonging to the corresponding category of the $i^{th}$ alternative label in an alternative region $F_{i-1}$, calculating a sub-alternative region corresponding to each POI, and taking a union set of all sub-alternative regions as an alternative region $F_i$. The sum of the regions surrounded by all sub-alternative regions constitutes the alternative region $F_i$, that is, any sub-alternative region is located in the alternative region $F_i$.

The method for calculating a sub-alternative region corresponding to a POI is as follows:

drawing an ellipse on an electronic map by taking the position of the POI and the cycling end point position as two end points of the major axis of the ellipse, where the length d of the major axis of the ellipse is equal to a linear distance between the position of the POI and the cycling end point position, the length f of the minor axis of the ellipse meets: f=β*d, and β being a positive number less than 1 (0<β<1); and taking a region surrounded by the ellipse as a sub-alternative region corresponding to the POI.

Step S4 includes the following steps:

S41: sequentially numbering the n POI category labels as 1, 2, . . . , n according to the sequence of the n POI category labels inputted by the user;

S42: all cycling routes that start from the cycling start point position, then sequentially passing through one alternative POI corresponding to each of the POI category labels numbered from 1 to n from front to back, and finally reaching the cycling end point position are planned, where n alternative POIs that each planned cycling route passes through are all different; the n POIs that the planned cycling routes pass through needing to meet the following requirements:

sequentially numbering the n POIs that the cycling routes pass through as 1, 2, . . . , n from front to back, and the POI numbered as k+1 needing to be located in a sub-alternative region corresponding to the POI numbered as k, where $1 \leq k \leq n-1$;

S43: calculating a cycling distance of each cycling route, and taking the cycling route with a cycling distance less than a maximum cycling distance d as a recommended cycling route for the user to select;

where the maximum cycling distance d is calculated by the following formula: d=α*a, and α being a positive number greater than 1; and S44: calculating the estimated cycling time of each recommended cycling route.

The method for calculating the estimated cycling time of the recommended cycling route is as follows:

N1: counting the number m of types of road conditions in the recommended cycling routes, sequentially numbering the m road conditions as 1, 2, . . . , m, finding out road condition distances $D_1, D_2 \ldots D_m$ corresponding to the road conditions numbered as 1, 2, . . . , m in the cycling routes, and finding out user cycling base speeds $TS_1, TS_2 \ldots TS_m$ corresponding to the road conditions numbered as 1, 2, . . . , m, where $TS_j$ represents a user historical cycling average speed under the sunny road condition numbered as j, and $1 \leq j \leq m$; and N2: calculating the estimated cycling time of the recommended cycling route by the following formula:

$$ET = \left(\frac{D_1}{TS_1} + \frac{D_2}{TS_2} + \ldots \frac{D_m}{TS_m}\right) * (1 + WCF);$$

where ET represents the estimated cycling time of the recommended cycling route, and WCF represents a weather correction factor.

The WCF is calculated by the following formula:

$$WCF = \frac{BS - WS}{WS};$$

where BS represents a user historical cycling average speed under a sunny flat highway condition, and WS represents a user historical cycling average speed under a weather condition during cycling and a flat highway condition.

The difference between this method and Embodiment 1 is that the specific steps in step S2 are different, and the steps in Step S42 are different. The other methods are identical. Through the above method, in the planned cycling route, the POI numbered as 1 is located in the POI selectable region (that is, the POI numbered as 1 is located in the alternative region $F_0$), and the POIs numbered as 2, . . . , n are located in the sub-alternative region corresponding to the previous POI (that is, located in the region surrounded by the ellipse taking a connecting line between the previous POI and the cycling end point as the major axis). In this way, the route of adjacent POIs in the planned cycling route faces the end point and will not deviate too far from the end point, thus avoiding the planned route from being opposite to the direction of the end point, increasing the efficiency of planning effective routes, and reducing the time and resources consumed by planning ineffective routes.

A travel plan route generation system in this embodiment, used for the above travel plan route generation method, includes:

a human-computer interaction terminal configured to perform human-computer interaction with a user;

a data collection module configured to collect cycling trajectories, cycling data, input instructions and latest POI information of the user, and store them in a cloud server;

a data analysis module configured to perform statistical analysis of the collected data; and a route planning module configured to automatically plan multiple suitable recommended cycling routes according to the cycling start point position information, cycling end point position information and POI category labels inputted by the user, calculate the estimated cycling time of each recommended cycling route, and provide multiple combination selections for different user needs.

The present invention has the following beneficial effects: (1) the present invention can automatically and quickly generate several recommended cycling routes for the user to select according to user needs, and automatically generate a corresponding travel plan route according to the selection of the user; and (2) the present invention can increase the efficiency of planning cycling routes, and reduce the time and resources consumed by planning ineffective routes.

What is claimed is:

1. A travel plan route generation method, comprising the following steps:

S1: obtaining cycling start point position information and cycling end point position information, and determining a point of interest (POI) selectable region between a cycling start point position and a cycling end point position, further comprising:

drawing an ellipse on an electronic map by taking the cycling start point position and the cycling end point position as two end points of major axis of the ellipse, wherein length a of the major axis of the ellipse is equal to a linear distance between the cycling start point position and the cycling end point position, length b of minor axis of the ellipse meets: b=β*a, and β being a positive number less than 1; and taking a region surrounded by the ellipse as the POI selectable region;

S2: obtaining POI category labels, and counting a number n of the POI category labels;

S3: finding out all POIs belonging to corresponding categories of the n POI category labels in the POI selectable region, and taking these POIs as alternative POIs;

S4: sequentially numbering the n POI category labels as 1, 2, . . . , n according to a sequence of the n POI category labels, planning several recommended cycling routes from the cycling start point position to the cycling end point position, each recommended cycling route sequentially passing through one of the alternative POI corresponding to each of the POI category labels numbered from 1 to n from front to back, and calculating an estimated cycling time of each recommended cycling route; and S5: generating a corresponding travel plan route according to the recommended cycling route, current road condition, weather and temperature, wherein the corresponding travel plan route meets a travel goal of a user, wherein the corresponding travel plan route meets the travel goal of different scenarios and enhances cycling experience.

2. The travel plan route generation method according to claim 1, wherein step S2 comprises the following steps:

S21: finding out all POI category labels available for the user to input and the number of times each POI category label that can be inputted in the POI selectable region for the user to select and input, wherein the number of times each POI category label can be inputted is equal to the total number of POIs belonging to the corresponding category of the POI category label in the POI selectable region; and S22: after the user inputs all selected POI category labels, obtaining the POI category labels inputted by the user and the input sequence, and counting the number n of the POI category labels inputted by the user.

3. The travel plan route generation method according to claim 2, wherein step S3 comprises the following specific steps:

finding out all POIs located in the POI selectable region and belonging to the corresponding category of the POI category label from a POI information database according to each POI category label inputted by the user, and taking these POIs as the alternative POIs.

4. The travel plan route generation method according to claim 2, wherein the method for calculating the estimated cycling time of the recommended cycling route in step S4 is as follows:

N1: counting number m of types of road conditions in the recommended cycling routes, sequentially numbering the m road conditions as 1, 2, . . . , m, finding out road condition distances $D_1, D_2 \ldots D_m$ corresponding to the road conditions numbered as 1, 2, . . . , m in the cycling routes, and finding out user cycling base speeds $TS_1, TS_2 \ldots TS_m$ corresponding to the road conditions numbered as 1, 2, . . . , m; and N2: calculating the estimated cycling time of the recommended cycling route by the following formula:

$$ET = \left(\frac{D_1}{TS_1} + \frac{D_2}{TS_2} + \ldots \frac{D_m}{TS_m}\right) * (1 + WCF),$$

wherein ET represents the estimated cycling time of the recommended cycling route, and WCF represents a weather correction factor.

5. A travel plan route generation system for the travel plan route generation method according to claim 2, comprising a processor and a human-computer interaction terminal, wherein the human-computer interaction terminal configured to perform human-computer interaction with a user;

wherein the processor is configured to execute:

a data collection module to collect cycling trajectories, cycling data, input instructions and latest POI information of the user, and store them in a cloud server;

a data analysis module to perform statistical analysis of the cycling trajectories, the cycling data, the input instructions and the latest POI information of the user to fetch feature information and classify and label the feature information;

a route optimization module to optimize and correct accuracy of the existing routes by accessing road condition data in a map database and meteorological data, calculate and synchronously estimate arrival time to the user in real time, and synchronize optimized route data to the cloud server; and a recommendation module to recommend most suitable route by accurately analyzing historical travel data and preferences of the user based on external factors such as current road condition, weather and temperature, and perform machine learning according feedback and evaluation, and optimize and improve the accuracy and personalization of route recommendation.

6. The travel plan route generation method according to claim 1, wherein step S3 comprises the following specific steps:

finding out all POIs located in the POI selectable region and belonging to the corresponding category of the POI category label from a POI information database according to each POI category label inputted by the user, and taking these POIs as the alternative POIs.

7. A travel plan route generation system for the travel plan route generation method according to claim 6, comprising a processor and a human-computer interaction terminal, wherein the human-computer interaction terminal configured to perform human-computer interaction with a user;

wherein the processor is configured to execute:

a data collection module to collect cycling trajectories, cycling data, input instructions and latest POI information of the user, and store them in a cloud server;

a data analysis module to perform statistical analysis of the cycling trajectories, the cycling data, the input instructions and the latest POI information of the user to fetch feature information and classify and label the feature information;

a route optimization module to optimize and correct accuracy of the existing routes by accessing road condition data in a map database and meteorological data, calculate and synchronously estimate arrival time to the user in real time, and synchronize optimized route data to the cloud server; and
a recommendation module to recommend most suitable route by accurately analyzing historical travel data and preferences of the user based on external factors such as current road condition, weather and temperature, and perform machine learning according feedback and evaluation, and optimize and improve the accuracy and personalization of route recommendation.

8. The travel plan route generation method according to claim 1, wherein step S4 comprises the following steps:
S41: sequentially numbering the n POI category labels as 1, 2, ..., n according to the sequence of the n POI category labels inputted by the user;
S42: planning all the cycling routes that start from the cycling start point position, then sequentially pass through one of the alternative POIs corresponding to each of the POI category labels numbered from 1 to n from front to back, and finally reaching the cycling end point position;
S43: calculating a cycling distance of each cycling route, and taking the cycling route with a cycling distance less than a maximum cycling distance d as a recommended cycling route for the user to select; and
S44: calculating the estimated cycling time of each recommended cycling route.

9. The travel plan route generation method according to claim 8, wherein n of the alternative POIs that each cycling route planned in step S42 passes through are all different.

10. The travel plan route generation method according to claim 8, wherein the maximum cycling distance d is calculated by the following formula: $d=\alpha*a$, and $\alpha$ being a positive number greater than 1.

11. The travel plan route generation method according to claim 8, wherein step S2 comprises the following steps:
S21: taking the POI selectable region as an alternative region $F_0$, and finding out all POI category labels available for the user to input in the alternative region $F_0$ as alternative labels, wherein all alternative labels form an alternative label group for the user to select and input, and the user can only select an alternative label from the alternative label group and input the alternative label;
S22: obtaining the alternative label inputted by the user, and updating the alternative label group every time when the user selects an alternative label from the alternative label group and inputs the alternative label, wherein the user can only select the next alternative label from the updated alternative label group and input the next alternative label;
when obtaining a selection completion instruction inputted by the user, counting all POI category labels inputted by the user and the input sequence, and counting the number n of the POI category labels inputted by the user;
wherein when the user inputs the $i^{th}$ alternative label ($1 \le i \le n$), the method for updating the alternative label group is as follows:
determining an alternative region $F_i$ according to the $i^{th}$ alternative label, finding out all POI category labels available for the user to input in the alternative region $F_i$ as new alternative labels, and forming a new alternative label group by all new alternative labels to replace the original alternative label group, thereby completing the update of the alternative label group;
wherein the method for determining the alternative region $F_i$ according to the $i^{th}$ alternative label is as follows:
finding out all POIs belonging to the corresponding category of the $i^{th}$ alternative label in an alternative region $F_{i-1}$, calculating a sub-alternative region corresponding to each POI, and taking a union set of all sub-alternative regions as an alternative region $F_i$;
wherein the method for calculating a sub-alternative region corresponding to a POI is as follows:
drawing an ellipse on an electronic map by taking the position of the POI and the cycling end point position as two end points of the major axis of the ellipse, wherein the length d of the major axis of the ellipse is equal to a linear distance between the position of the POI and the cycling end point position, the length f of the minor axis of the ellipse meets: $f=\beta*d$, and $\beta$ being a positive number less than 1; taking a region surrounded by the ellipse as a sub-alternative region corresponding to the POI;
wherein the n POIs that the cycling routes planned in step S42 pass through need to meet the following requirements:
sequentially numbering the n POIs that the cycling routes pass through as 1, 2, ..., n from front to back, and the POI numbered as k+1 needing to be located in a sub-alternative region corresponding to the POI numbered as k, wherein $1 \le k \le n-1$.

12. A travel plan route generation system for the travel plan route generation method according to claim 8, comprising a processor and a human-computer interaction terminal, wherein
the human-computer interaction terminal configured to perform human-computer interaction with a user;
wherein the processor is configured to execute:
a data collection module to collect cycling trajectories, cycling data, input instructions and latest POI information of the user, and store them in a cloud server;
a data analysis module to perform statistical analysis of the cycling trajectories, the cycling data, the input instructions and the latest POI information of the user to fetch feature information and classify and label the feature information;
a route optimization module to optimize and correct accuracy of the existing routes by accessing road condition data in a map database and meteorological data, calculate and synchronously estimate arrival time to the user in real time, and synchronize optimized route data to the cloud server; and
a recommendation module to recommend most suitable route by accurately analyzing historical travel data and preferences of the user based on external factors such as current road condition, weather and temperature, and perform machine learning according feedback and evaluation, and optimize and improve the accuracy and personalization of route recommendation.

13. The travel plan route generation method according to claim 1, wherein the method for calculating the estimated cycling time of the recommended cycling route in step S4 is as follows:
N1: counting number m of types of road conditions in the recommended cycling routes, sequentially numbering the m road conditions as 1, 2, ..., m, finding out road condition distances $D_1, D_2 \ldots D_m$ corresponding to the road conditions numbered as 1, 2, ..., m in the cycling routes, and finding out user cycling base speeds $TS_1$, TS$_2$ ... TS$_m$ corresponding to the road conditions numbered as 1, 2, ..., m; and N2: calculating the estimated cycling time of the recommended cycling route by the following formula:

$$ET = \left(\frac{D_1}{TS_1} + \frac{D_2}{TS_2} + \ldots \frac{D_m}{TS_m}\right) * (1 + WCF),$$

wherein ET represents the estimated cycling time of the recommended cycling route, and WCF represents a weather correction factor.

14. The travel plan route generation method according to claim 13, wherein the WCF is calculated by the following formula:

$$WCF = \frac{BS - WS}{WS},$$

wherein BS represents a historical cycling average speed under sunny highway conditions of the user, and WS represents a historical cycling average speed under weather conditions and highway conditions during cycling of the user.

15. The travel plan route generation method according to claim 13, wherein step S4 further comprises the following step:

calculating the estimated total time TA of each recommended cycling route;

the method for calculating the estimated total time TA of one of the recommended cycling route is as follows:

sequentially numbering the n POIs that the recommended cycling route passes through as 1, 2, ..., n from front to back, wherein 1≤i≤n; calculating the estimated residence time of each POI, wherein the estimated residence time of the POI numbered as i is $t_i$; and calculating the estimated total time $T_A$: $T_A = ET + \rho_{i=1}^{n} t_i$.

16. A travel plan route generation system for the travel plan route generation method according to claim 1, comprising a processor and a human-computer interaction terminal, wherein the human-computer interaction terminal configured to perform human-computer interaction with a user;

wherein the processor is configured to execute:

a data collection module to collect cycling trajectories, cycling data, input instructions and latest POI information of the user, and store them in a cloud server;

a data analysis module to perform statistical analysis of the cycling trajectories, the cycling data, the input instructions and the latest POI information of the user to fetch feature information and classify and label the feature information;

a route optimization module to optimize and correct accuracy of the existing routes by accessing road condition data in a map database and meteorological data, calculate and synchronously estimate arrival time to the user in real time, and synchronize optimized route data to the cloud server; and a recommendation module to recommend most suitable route by accurately analyzing historical travel data and preferences of the user based on external factors such as current road condition, weather and temperature, and perform machine learning according feedback and evaluation, and optimize and improve the accuracy and personalization of route recommendation.

* * * * *